US007983660B2

(12) United States Patent
Bao et al.

(10) Patent No.: US 7,983,660 B2
(45) Date of Patent: Jul. 19, 2011

(54) MOBILE TELEPHONE DEVICE IDENTIFYING WHETHER INCOMING WIRELESS CALL ANCHORED BY AN ENHANCED SERVICES SERVER

(75) Inventors: Ho Bao, Richardson, TX (US);
Hemendra Rana, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 772 days.

(21) Appl. No.: 11/972,465

(22) Filed: Jan. 10, 2008

(65) Prior Publication Data

US 2009/0181648 A1    Jul. 16, 2009

(51) Int. Cl.
*H04M 3/42* (2006.01)
*H04M 3/00* (2006.01)
*H04L 29/08* (2006.01)
*H04B 1/38* (2006.01)

(52) U.S. Cl. .................. 455/414.1; 455/414.4; 455/416; 455/418; 455/557

(58) Field of Classification Search ............... 370/280, 370/294, 313–314, 328–329, 338, 336–337, 370/341, 345, 347, 349–350, 259–260, 310; 455/414.1, 414.4, 418, 434, 466, 514–515, 455/517, 521, 550.1, 552.1, 554.1, 555, 556.2, 455/560–561, 566–567, 403, 415–20, 461, 455/557–558; 379/280–284, 286, 339, 120, 379/114.05, 142.18, 157, 201.01–201.02, 379/207.02, 207.11, 243; 709/202–203, 709/219
See application file for complete search history.

(56) References Cited

U.S. PATENT DOCUMENTS

| 6,430,174 | B1 | 8/2002 | Jennings et al. | |
|---|---|---|---|---|
| 2006/0002538 | A1 | 1/2006 | Dezonno | |
| 2006/0109970 | A1* | 5/2006 | Shim et al. | ............... 379/207.16 |
| 2006/0222157 | A1* | 10/2006 | Kanerva et al. | .......... 379/211.01 |
| 2007/0037605 | A1* | 2/2007 | Logan | ........................ 455/567 |
| 2007/0123224 | A1* | 5/2007 | Nishiyama et al. | ........ 455/414.1 |
| 2007/0183364 | A1 | 8/2007 | Donovan et al. | |
| 2007/0197224 | A1* | 8/2007 | Winkler | ........................ 455/445 |
| 2007/0233615 | A1 | 10/2007 | Tumminaro | |
| 2007/0254660 | A1* | 11/2007 | Zhou et al. | .................... 455/436 |

FOREIGN PATENT DOCUMENTS

| DE | 3721047 A1 | 1/1988 |
|---|---|---|
| EP | 1748634 A2 | 1/2007 |
| WO | WO 03/045102 A1 | 5/2003 |

OTHER PUBLICATIONS

Wikipedia, "3G", [online], Nov. 5, 2007 [retrieved on Nov. 6, 2007]. Retrieved from the Internet: <URL:http://en.wikipedia.org/w/index.php$title=3G&printable=yes>, pp. 1-7.

* cited by examiner

*Primary Examiner* — Meless N Zewdu
(74) *Attorney, Agent, or Firm* — Leon R. Turkevich

(57) ABSTRACT

In one embodiment, a method comprises a mobile node receiving an incoming wireless call; the mobile node determining whether enhanced services are available for the incoming wireless call based on outputting a DTMF tone on a voice channel associated with the incoming wireless call and determining whether a notify message, indicating a server providing the enhanced services has received the DTMF tone, is received on a data channel during the incoming wireless call; and the mobile node selectively initiating the enhanced services for the incoming wireless call with the server in response to determining the enhanced services are available for the incoming wireless call.

18 Claims, 3 Drawing Sheets

MOBILE TELEPHONE DEVICE IDENTIFYING WHETHER INCOMING WIRELESS CALL ANCHORED BY AN ENHANCED SERVICES SERVER

TECHNICAL FIELD

The present disclosure generally relates to mobile telephony devices. More particularly, the present disclosure relates to mobile telephony devices providing enhanced mobile communications services based on transport of data messages via a wireless telephony network.

BACKGROUND

Mobile phone communications technology has evolved to the third-generation, also referred to as "3G" technology, where network operators can offer users a wider range of more advanced services, including wide area wireless voice telephony and broadband wireless data within a mobile environment. Earlier technologies prior to "3G" (i.e., pre-3G technologies) were limited in that only one voice or data channel could be active at a time. In contrast, "3G" permits parallel and independent use of a voice channel and a data channel, also referred to as Dual-Transfer Mode (DTM).

Efforts also are underway to offer enhanced services to mobile phones using a 3G network. The "enhanced services" refer to enterprise-type telephony services that historically have been offered only to telephony users of a private branch exchange, including calling features such as hold, resume, transfer, conference, single number reach, "park" (i.e., waiting to call back a destination that currently is busy), call forwarding activation and deactivation, etc., and other enterprise-type services for enterprise telephony users such as unified communications. Such enhanced services can be provided to a mobile phone via an existing wireless telephony network (e.g., GSM, CDMA) based on supplying enhanced services signaling data via the wireless telephony network data channel while providing the voice data via the wireless telephony network voice channel.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
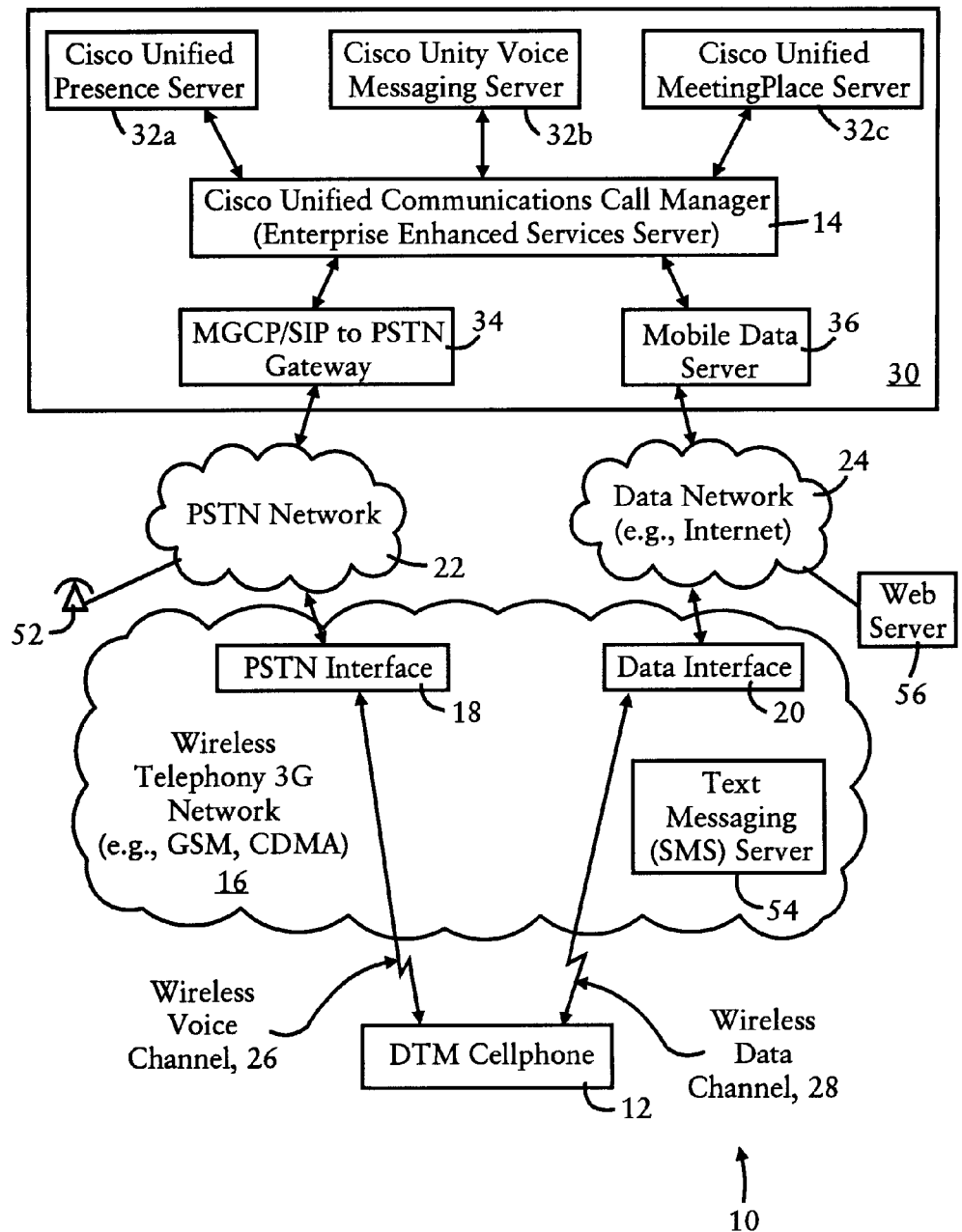
FIG. 1 illustrates an example system including a wireless mobile node configured for providing enhanced services to a user based on communications with a server providing the enhanced services via a wireless telephony network, according to an example embodiment.

In one embodiment, a method comprises a mobile node receiving an incoming wireless call; the mobile node determining whether enhanced services are available for the incoming wireless call based on outputting a dual tone multiple frequency (DTMF) tone on a voice channel associated with the incoming wireless call and determining whether a notify message, indicating a server providing the enhanced services has received the DTMF tone, is received on a data channel during the incoming wireless call; and the mobile node selectively initiating the enhanced services for the incoming wireless call with the server in response to determining the enhanced services are available for the incoming wireless call.

In another embodiment, an apparatus comprises a wireless network interface circuit configured for receiving an incoming wireless call, and a second circuit. The second circuit is configured for responding to the incoming wireless call by causing the wireless network interface circuit to output a dual tone multiple frequency (DTMF) tone on a voice channel associated with the incoming wireless call. The second circuit further is configured for determining whether enhanced services are available for the incoming wireless call based on determining whether a notify message, indicating a server providing the enhanced services has received the DTMF tone, is received on a data channel during the incoming wireless call. The second circuit further is configured for selectively initiating the enhanced services for the incoming wireless call with the server in response to determining the enhanced services are available for the incoming wireless call.

In yet another embodiment, logic is encoded in one or more tangible media for execution and when executed operable to: receiving an incoming wireless call by a mobile node; determining by the mobile node whether enhanced services are available for the incoming wireless call based on outputting a dual tone multiple frequency (DTMF) tone on a voice channel associated with the incoming wireless call and determining whether a notify message, indicating a server providing the enhanced services has received the DTMF tone, is received on a data channel during the incoming wireless call; and selectively initiating, by the mobile node, the enhanced services for the incoming wireless call with the server in response to determining the enhanced services are available for the incoming wireless call.

DETAILED DESCRIPTION

Particular embodiments enable a mobile node, for example a mobile wireless telephone, to identify an incoming wireless call received via a wireless telephony network from a server, the server configured for providing enhanced communications services based on concurrent use of a voice channel and a data channel for incoming wireless phone call to the mobile node. The mobile wireless telephone can identify whether the incoming wireless phone call is from a server providing enhanced communications services based on determining whether the "calling party" having initiated the incoming wireless call is able to detect a dual tone multiple frequency (DTMF) tone and respond in a prescribed manner. If the server detects that the mobile node has output a DTMF tone on the voice channel associated with the incoming wireless call to the mobile node, the server can output on the data channel associated by the server with the incoming wireless call a corresponding notify message indicating the server has received the DTMF tone. The notify message received by the mobile node can represent not only that the server is concurrently using the voice channel and the data channel for the incoming wireless call, but also that the server is configured for providing enhanced services to the mobile node for the incoming wireless phone call.

Hence, the mobile node can selectively initiate the enhanced services for the incoming wireless call with the server in response to determining the enhanced services are available, based on reception of the prescribed notify message. If the mobile node fails to detect the prescribed notify message within a prescribed time interval (e.g., 500 ms), the mobile node can conclude that the incoming wireless phone call was initiated from another source (e.g., a conventional calling party via the PSTN) that does not offer the enhanced communications services.

The combined use of the voice channel to transmit the DTMF tone and the data channel to detect the notify message from the server is particularly effective in ensuring the integrity of enhanced services between the mobile node and the server, especially in cases where multiple call processing activities may be performed via the data channel prior to reception of the incoming wireless call that concurrently uses the voice channel and the data channel. For example, assume that the server and the mobile node have executed multiple call processing activities related to an enhanced service and prior to initiation of a wireless voice call between the server and the mobile node; assume further that an unrelated party (e.g., an individual) establishes a wireless phone call with the mobile node before the server can establish the incoming wireless call associated with the previously-executed call processing activities. In this case, the mobile node can identify the incoming wireless call as unrelated to the prior call processing activities for enhanced wireless services, and therefore enable a user of the mobile node to perform a conventional wireless phone call with the calling party.

In addition, the transmission of a DTMF tone on the voice channel, in combination with detecting reception of the notify message on the data channel, is more reliable than the mobile node relying upon caller ID information, since the caller ID information may be incomplete or incompatible with detection circuitry in the mobile node, and because caller ID information can be forged or "spoofed".

FIG. 1 illustrates an example system 10 including a wireless mobile node 12 configured for providing enhanced services to a user based on communications with a server 14 providing the enhanced services via a wireless telephony network 16 according to an example embodiment. The wireless telephony network 16, illustrated for example as a third generation ("3G") network, includes a public switched telephone network (PSTN) interface 18 and a data interface 20. The PSTN interface 18 is configured for interfacing with a public switched telephone network 22, for example based on setup and teardown of circuit-switched connections according to prescribed circuit-switched telephony protocols (e.g., SS7). The data interface 20 is configured for interfacing with a wide area data network 24, for example the Internet, according to the existing network protocols such as Internet Protocol (IP) (e.g., IPv4, IPv6). Hence, the wireless telephony network 16 can establish concurrent voice and data connections for the wireless mobile node 12 via a wireless voice channel 26, and a wireless data channel 28, respectively.

The server 14 can be configured for providing enhanced services (i.e., enterprise-type telephony services) to the wireless mobile node 12 based on sending relevant enhanced services data to the wireless mobile node 12 via the wireless data channel 28 concurrent with the transfer of voice data via the wireless voice channel 26. For example, the server 14, implemented for example using the commercially-available Cisco Unified Communications Call Manager from Cisco Systems, San Jose, Calif., can be implemented within an enterprise system (e.g., a large-scale business) 30 that includes multiple servers (e.g., 32a, 32b, 32c) for providing enhanced services to subscribers within the enterprise system 30. For example, the server 14 can provide enhanced services based on interfacing with various communications-based servers, including a presence server 32a configured for providing presence-based information for each subscriber within the enterprise system 30, a unified messaging server 32b configured for providing unified messaging for new subscribers within the enterprise system 30, and a unified meeting server 32c configured for providing unified meeting and conferencing services for each subscriber within the enterprise system 30. Although not illustrated in FIG. 1, the enterprise system 30 can provide enhanced services to both wired telephony devices as well as wireless devices such as the wireless mobile node 12. The server 32a can be implemented using the commercially-available Cisco Unified Presence Server from Cisco Systems. The server 32b can be implemented using the commercially-available Cisco Unity Voice Messaging Server from Cisco Systems. The server 32c can be implemented using the commercially-available Cisco Unified MeetingPlace Server from Cisco Systems.

The server 14 can be configured for sending voice data to the wireless mobile node 12 via a gateway 34, for example a voice over IP based gateway that can be configured for implementing voice over IP-based communications, for example Media Gateway Control Protocol (MGCP) (described for example in the Internet Engineering Task Force (IETF) Request for Comments (RFC) 3435) or Session Initiation Protocol (SIP) (described for example in the IETF RFC 3261). The server 14 also can be configured for sending non-voice data (e.g., enhanced services data) to the wireless mobile node 12 via a mobile data server 36. Hence, the wireless mobile node 12 can implement enhanced services for an incoming wireless call based on concurrent reception of voice data via the wireless voice channel 26 and enhanced services data via the wireless data channel 28 from the enterprise enhanced services server 14. Also note that the enhanced services described herein are distinct from any call services offered by the wireless telephony network 16, since the concurrent voice and data communications are anchored by (i.e., provided by) the server 14.

Figure 2:
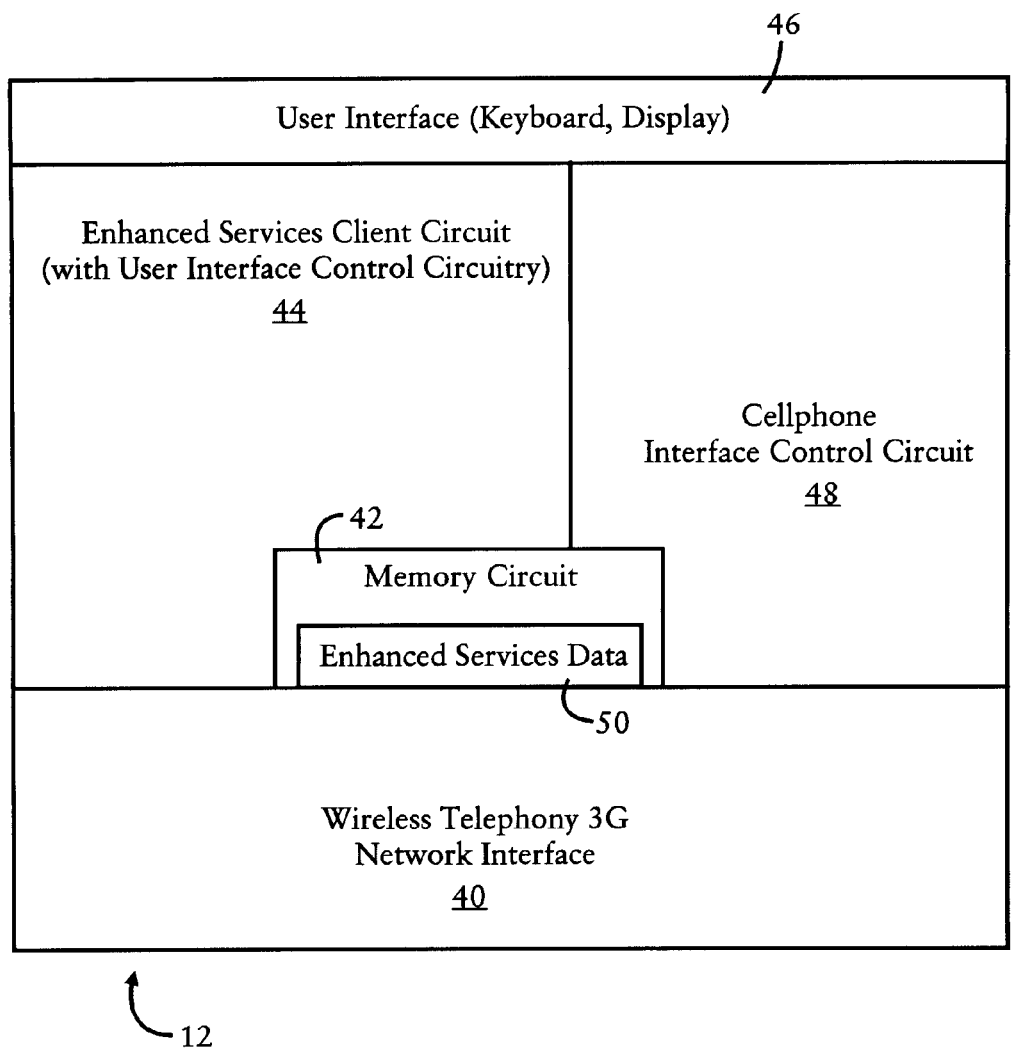
FIG. 2 illustrates an example wireless mobile node according to an example embodiment.

FIG. 2 illustrates an example wireless mobile node 12, according to an example embodiment. The wireless mobile node 12, can include a wireless telephony network interface 40, a memory circuit 42, and enhanced services client circuit 44, and a user interface 46 that includes user interface circuitry such as a keyboard, a display, user navigation or selection devices, etc. Depending on implementation, the wireless mobile node 12 also can include a user interface telephony circuit 48, also referred to as a cellphone interface control circuit, configured for handling conventional telephony operations with the wireless telephony network 16.

The wireless telephony network interface 40 can be configured for initiating and receiving voice calls and data calls via the wireless telephony network 16, including setup and teardown of wireless voice phone calls via the wireless voice channel 26 using prescribed wireless 3G access protocols such as GSM and/or CDMA. The wireless telephony network interface 40 also can be configured for concurrently sending and receiving data to and from the data network 24 via the wireless data channel 28. As described previously, the wireless telephony network interface 40 can be configured for concurrently sending and receiving data on the wireless voice channel 26 and the wireless data channel 28. Although not illustrated in FIG. 2, the wireless mobile node 12 also can include other network interfaces configured for operating according to various access protocols, enabling the wireless mobile node 12 to operate as a "dual mode" or "multimode" wireless phone that can access different wireless telephony networks using the appropriate access protocols (e.g., GSM, CDMA, AMPS, IEEE 802.11b/g, etc.).

The enhanced services client circuit 44, implemented for example using the commercially-available Cisco Unified Mobile Communicator from Cisco Systems, can be configured for providing enhanced services for a user of the wireless mobile node 12, based on concurrent communication of voice data by the wireless voice channel 26, and enhanced services data via the wireless data channel 28, with the server 14 of FIG. 1. For example, the enhanced services client circuit 44 can be implemented as an enhanced MGCP or SIP client that provides enhanced services associated with enterprise communications services (also referred to as "mid-call" features). As described previously, example enhanced services include calling features such as hold, resume, transfer, conference, single-number reach, park, call forwarding activation and deactivation, unified communications, etc. Hence, the enhanced services client circuit 44 can control the wireless telephony network interface 40, as needed, to implement the enhanced services provided by the server 14, including initiating outgoing wireless voice calls, receiving and answering incoming wireless voice calls, and sending and receiving enhanced services data via the wireless data channel 28.

As described below, the enhanced services client circuit 44 also can cause the wireless telephony network interface 40 to output an audible DTMF tone on the wireless voice channel 26. The enhanced services client circuit 44 also can control the user interface 46, for example based on presenting displays to the user, and dynamically assigning soft key values to context-sensitive user selection keys within the keyboard or touchkey inputs on the display. Hence, the enhanced services client circuit 44 can control both the wireless telephony network interface 40 and the user interface 46 for implementation of enhanced services provided by the server 14.

As described in further detail below with respect to FIG. 3, the user interface telephony circuit 48 can be configured for executing control over an incoming wireless call based on the enhanced services client circuit 44 releasing control over the incoming wireless call, for example based on the enhanced services client circuit 44 determining that an incoming call is not an enhanced services call anchored by (i.e., provided by) the server 14. Alternatively, the circuitry and operations of the user interface telephony circuit 48 can be implemented within the enhanced services client circuit 44, where the integrated client circuit can provide either enhanced services to a user, or conventional services to a user, based on determining whether the enhanced services are available for the incoming wireless call.

The memory circuit 42 can be configured for storing configuration data for the wireless mobile node 12, including enhanced services data 50 generated either by the enhanced services client circuit 44, or the server 14 and supplied via the wireless data channel 28.

Any of the disclosed circuits of the wireless mobile node 12 can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a processor circuit (not shown), where execution of executable code stored in an internal memory circuit (e.g., within the memory circuit 42) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 42 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the enhanced services client circuit 44, for example based on memory address assignment and partitioning executed by the enhanced services client circuit 44.

Figure 3:
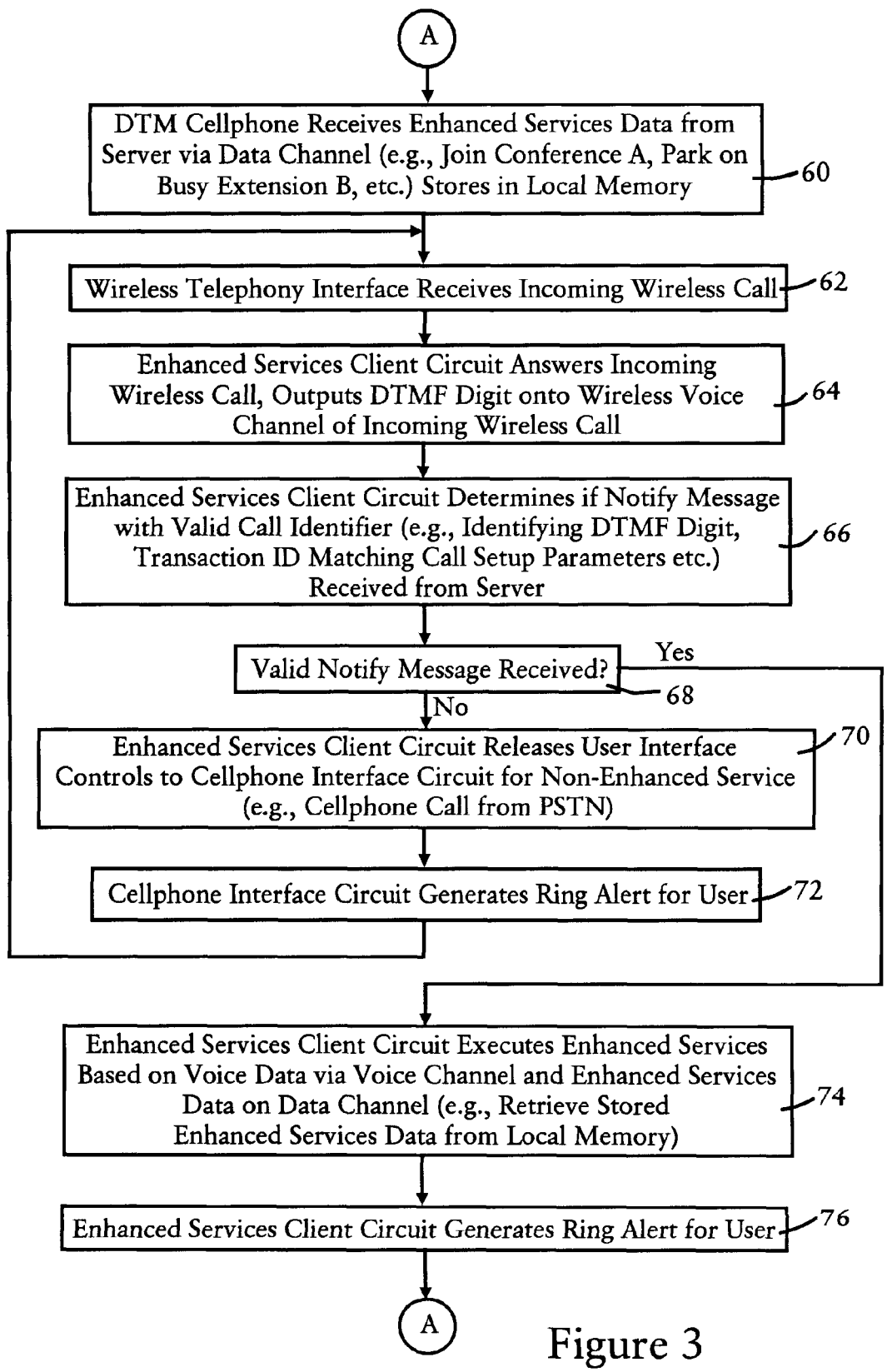
FIG. 3 illustrates an example method via the wireless mobile node of FIG. 2, according to an example embodiment.

FIG. 3 illustrates an example method via the wireless mobile node 12 of FIG. 2, according to an example embodiment. The steps described in FIG. 3 can be implemented as executable code stored on a computer readable medium (e.g., floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The enhanced services client circuit 44 can receive in step 60 enhanced services data from the enhanced services server 14 via the wireless data channel 28 prior to receiving in step 62 an incoming wireless call via the wireless voice channel 26. For example, the enhanced services client circuit 44 can engage in multiple transactions with the enhanced services server 14 via the wireless data channel 28, related to the enhanced services provided by the server 14. Example enhanced services data can include including updating of subscriber phone lists that are stored locally within the memory circuit 42, updating of presence information supplied by the presence server 32a (e.g., identifying whether a given subscriber is available for a phone call, unavailable, or busy), receiving a prompt whether to join a given conference "A", receiving a prompt whether to "park" on a busy extension, receiving a prompt whether to accept a call from a subscriber in the enterprise system 30 or transfer to the unified messaging server 32b, etc. Enhanced services also can include receiving voice over IP-based call processing parameters, for example transmission of a SIP INVITE message by the server 14 to the enhanced services client circuit 44 via the wireless data channel 28.

The wireless telephony interface 40 receives in step 62 an incoming wireless call via the wireless voice channel 26 and that is detected by the enhanced services client circuit 44. The incoming wireless call can include reception of call setup parameters (specific to the wireless telephony network 16) on a wireless signaling channel (not shown) that is distinct from the wireless voice channel 26. The enhanced services client circuit 44, in response to detecting the incoming wireless call received by the network interface 40, can answer in step 64 the incoming wireless call and cause the network interface 40 to output a prescribed DTMF digit onto the wireless voice channel 26 for the incoming wireless call. The prescribed DTMF digit can be generated by the enhanced services client circuit 44 and supplied to the network interface 40; alternately the network interface 40 can be configured to generate and outputs the prescribed DTMF digit in response to a DTMF generation command from the enhanced services client circuit 44. As described above, the prescribed DTMF digit is used by the enhanced services client circuit 44 to determine whether enhanced services are available for the incoming wireless call, or whether the incoming wireless call was originated by a "conventional" calling party (e.g., a calling party that is using the conventional PSTN telephony device 52 to call the wireless mobile node 12).

The enhanced services client circuit 44 can determine in step 66 whether the wireless network interface 40 has received, via the wireless data channel 28, a notify message within a prescribed time interval following transmission of the DTMF digit on the wireless voice channel 26 (e.g., 500 ms). As illustrated with respect to FIG. 1, since enhanced services by the enhanced services client circuit 44 are based on concurrent communications with the server 14 via the wireless voice channel 26 and the wireless data channel 28, the server 14 can be configured for responding to the DTMF digit transmitted via the wireless voice channel 26 (and received by the server 14 via the PSTN network 22 and the gateway 34) by outputting a notify message for delivery via the corresponding wireless data channel 28 assigned to the wireless mobile node 12, for example based on associating the wireless mobile node 12 with a prescribed IP destination address. The notify message output by the server 14 also can include prescribed identifiers that enable the enhanced services client circuit 44 to uniquely identify the notify message relative to the incoming wireless call, for example identifying the DTMF digit output by the wireless mobile node 12 onto the wireless voice channel 26, identifying a transaction identifier used during call setup for the incoming wireless call on the wireless voice channel, etc. Also note that the notify message must be received by the wireless mobile node 12 via the wireless data channel 28, hence any DTMF tones or fax tones received by the wireless mobile node 12 via the wireless voice channel 26 can be suppressed by the network interface 40 and/or ignored by the enhanced services client circuit 44.

Hence, if in step 68 the enhanced services client circuit 44 determines that a valid notify message was not received within a prescribed time interval, the enhanced services client circuit 44 can conclude that the incoming call was not generated by the server 14, but by an alternate source (e.g., a user of the PSTN telephone 52). In response to the enhanced services client circuit 44 concluding that the incoming call is not generated by the server 14, the enhanced services client circuit 44 can release the user interface controls in step 70 to the cellphone interface control circuit 48 for conventional non-enhanced wireless telephony services, including generating a ring alert in step 72 for an incoming wireless cell phone call having originated from a conventional source such as another cellphone in the network 16 or the PSTN telephone 52. Alternately, if the cellphone interface control circuitry 40 is integrated within the enhanced services client circuitry 44, the enhanced services client circuit 44 can provide conventional (i.e., non-enhanced) wireless telephony services to the user interface 46. Hence, the enhanced services client circuit 44 can permit the "interruption" of enhanced services by permitting conventional wireless telephony services, while suspending communications with the enhanced services server 14 via the wireless data channel 28 during the conventional wireless telephone call. After completion of the conventional wireless telephone call in step 72 (including teardown of the voice call on the wireless voice channel 26), the enhanced services client circuit 44 can detect a new incoming wireless call in step 62.

If in step 68 the enhanced services client circuit 44 determines that a valid notify message was received within the prescribed interval, indicating the server 14 received the DTMF tone output in step 64, the enhanced services client circuit 44 can initiate in step 74 the execution of enhanced services based on voice data received by the network interface 40 via the wireless voice channel 26, and enhanced services data received by the network interface 40 via the wireless data channel 28. As described previously, the enhanced services data also can be retrieved as stored data 50 from the memory circuit 42. The enhanced services client circuit 44, upon initiating the enhanced services, can generate a default ring alert or a custom ring alert for the user in step 76, based on preferences settings associated with the enhanced services offered by the server 14 and the client circuit 44.

According to the example embodiment, a wireless network node 12 can distinguish between an incoming call generated by an enhanced services server 14 that concurrently uses a wireless voice channel and a wireless data channel, as opposed to a conventional wireless phone call generated by a user of either the PSTN network 22 or the wireless telephony network 16. The example embodiment provides a deterministic method for the wireless network node 12 to determine whether the incoming call was anchored by the enhanced services server 14, enabling non-anchored calls to be received without adversely affecting communications and signaling protocols between the client circuit 44 and the server 14 via the wireless data channel 28.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    a mobile node receiving an incoming wireless call;
    the mobile node determining whether enhanced services are available for the incoming wireless call based on outputting a dual tone multiple frequency (DTMF) tone on a voice channel associated with the incoming wireless call and determining whether a notify message, indicating a server providing the enhanced services has received the DTMF tone, is received on a data channel during the incoming wireless call; and
    the mobile node selectively initiating the enhanced services for the incoming wireless call with the server in response to determining the enhanced services are available for the incoming wireless call.

2. The method of claim 1, wherein the selectively initiating includes an enhanced services client circuit within the mobile node executing control over the incoming wireless call based on establishing data communications with the server via the data channel.

3. The method of claim 2, further comprising a user interface telephony circuit executing control over the incoming wireless call in response to a determined absence of the notify message.

4. The method of claim 3, wherein:
the enhanced services client circuit determines the determined absence of the notify message;
the user interface telephony circuit executing control based on the enhanced services client circuit releasing control of the incoming wireless call in response to determining the determined absence of the notify message.

5. The method of claim 3, wherein one of the enhanced services client circuit executes control over the incoming wireless call, or the user interface telephony circuit executing control over the incoming wireless call, based on whether the notify message is detected, prior to the mobile node generating a notification to notify a user of the mobile node of the incoming wireless call.

6. The method of claim 1, wherein the selectively initiating the enhanced services is executed prior to the mobile node generating a notification to notify a user of the mobile node of the incoming wireless call.

7. The method of claim 1, further comprising receiving enhanced services data from the server on the data channel and prior to the incoming wireless call, including storing the enhanced services data in a local memory, the selectively initiating including retrieving the enhanced services data from the local memory in response to a detected association between the incoming wireless call and the enhanced services data.

8. The method of claim 1, wherein the determining includes identifying whether the notify message specifies an acknowledgment digit matching a prescribed DTMF value of the DTMF tone.

9. An apparatus comprising:
a wireless network interface circuit configured for receiving an incoming wireless call; and
a second circuit configured for responding to the incoming wireless call by causing the wireless network interface circuit to output a dual tone multiple frequency (DTMF) tone on a voice channel associated with the incoming wireless call;
the second circuit configured for determining whether enhanced services are available for the incoming wireless call based on determining whether a notify message, indicating a server providing the enhanced services has received the DTMF tone, is received on a data channel during the incoming wireless call;
the second circuit further configured for selectively initiating the enhanced services for the incoming wireless call with the server in response to determining the enhanced services are available for the incoming wireless call.

10. The apparatus of claim 9, wherein the second circuit is configured for executing control over the incoming wireless call based on establishing data communications with the server via the data channel.

11. The apparatus of claim 10, further comprising a user interface telephony circuit configured for executing control over the incoming wireless call in response to a determined absence of the notify message by the second circuit.

12. The apparatus of claim 11, wherein the user interface telephony circuit is configured for executing control over the incoming wireless call based on the second circuit releasing control of the incoming wireless call in response to the second circuit determining the determined absence of the notify message.

13. The apparatus of claim 11, wherein one of the second circuit or the user interface telephony circuit executes control over the incoming wireless call, based on whether the notify message is detected, prior to the apparatus generating a notification to notify a user of the mobile node of the incoming wireless call.

14. The apparatus of claim 9, wherein the second circuit is configured for initiating the enhanced services prior to the apparatus generating a notification to notify a user of the mobile node of the incoming wireless call.

15. The apparatus of claim 9, further comprising a local memory configured for storing enhanced services data in response to the wireless network interface circuit receiving the enhanced services data from the server on the data channel prior to the incoming wireless call, the second circuit configured for retrieving the enhanced services data from the local memory in response to a detected association between the incoming wireless call and the enhanced services data.

16. The apparatus of claim 9, wherein the second circuit is configured for identifying whether the notify message specifies an acknowledgment digit matching a prescribed DTMF value of the DTMF tone.

17. An apparatus comprising:
a wireless network interface circuit configured for receiving an incoming wireless call; and
means for responding to the incoming wireless call by causing the wireless network interface circuit to output a dual tone multiple frequency (DTMF) tone on a voice channel associated with the incoming wireless call;
the means for responding configured for determining whether enhanced services are available for the incoming wireless call based on determining whether a notify message, indicating a server providing the enhanced services has received the DTMF tone, is received on a data channel during the incoming wireless call;
the means for responding further configured for selectively initiating the enhanced services for the incoming wireless call with the server in response to determining the enhanced services are available for the incoming wireless call.

18. Non-transitory logic encoded in one or more tangible media for execution and when executed operates to:
receiving an incoming wireless call by a mobile node;
determining by the mobile node whether enhanced services are available for the incoming wireless call based on outputting a dual tone multiple frequency (DTMF) tone on a voice channel associated with the incoming wireless call and determining whether a notify message, indicating a server providing the enhanced services has received the DTMF tone, is received on a data channel during the incoming wireless call; and
selectively initiating, by the mobile node, the enhanced services for the incoming wireless call with the server in response to determining the enhanced services are available for the incoming wireless call.

* * * * *